United States Patent [19]
Rich

[11] 4,188,734
[45] Feb. 19, 1980

[54] EDUCATIONAL TOY

[76] Inventor: Cy Rich, Belhaven, N.C. 27810

[21] Appl. No.: 900,322

[22] Filed: Apr. 26, 1978

[51] Int. Cl.² ............................................. G09B 17/00
[52] U.S. Cl. .................................................. 35/35 H
[58] Field of Search ................. 35/22 A, 31 D, 31 F, 35/35 H, 73

[56] References Cited
U.S. PATENT DOCUMENTS

| | | | |
|---|---|---|---|
| 641,739 | 1/1900 | Thompson | 35/35 H X |
| 898,587 | 9/1908 | Matthias | 35/73 X |
| 1,668,328 | 5/1928 | Martien | 35/73 |
| 2,695,462 | 11/1954 | Gilbert | 35/31 D |
| 2,884,714 | 5/1959 | Lawrence | 35/73 X |
| 3,077,677 | 2/1963 | Malkin et al. | 35/35 H |
| 3,224,114 | 12/1965 | Swanson | 35/31 D |
| 3,374,558 | 3/1968 | Smith, Jr. | 35/31 D |
| 3,970,312 | 7/1976 | Senn | 35/35 H X |

*Primary Examiner*—William H. Grieb
*Attorney, Agent, or Firm*—Craig and Antonelli

[57] ABSTRACT

An educational toy is provided which includes a block of material, preferably a solid block of wood or plastic in the shape of a board and with a plurality of holes extending completely therethrough. A number of pegs are also provided which fit loosely into the holes in the board and have a corresponding cross sectional shape as the holes. In preferred embodiments, these pegs are substantially longer than the thickness of the board so that they protrude upwardly from the board when placed in position in the holes with the board on a table or other flat backing surface. One side of the board includes respective letters of the alphabet adjacent the holes, while the other side of the board includes the numbers 1 to 26 adjacent the respective holes. Each of the pegs is provided at one end with a letter and at the opposite end with a number, so that a matching of the letters on the pegs with the letters adjacent the holes can be accommodated with one side of the board facing upwardly, while a matching of the numbered ends of the pegs with the numbered holes is accommodated when the board is turned over. In preferred embodiments, the alphabet is arranged in rows on the board, as is the number arrangement at the opposite end of the board, and each of these rows are colored a different color, with the respective pegs being correspondingly colored, so that subgroups of the alphabet and/or of the numbers, can be easily matched by the color code indication on the board and the pegs. In particularly preferred embodiments, additional through holes are arranged near one side of the board to accommodate insertion of the pegs therein to form different words and/or to carry out different simple arithmetic steps, with an additional set of pegs having the vowels at one end thereof and arithmetic symbols at the opposite end thereof. Certain preferred embodiments include braille indicia for the respective colors, letters, and numbers, so as to accommodate use of the toy by blind persons.

29 Claims, 8 Drawing Figures

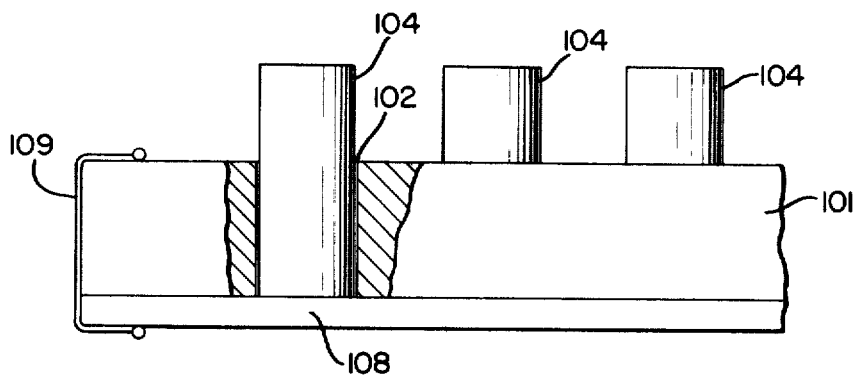
FIG. 4.
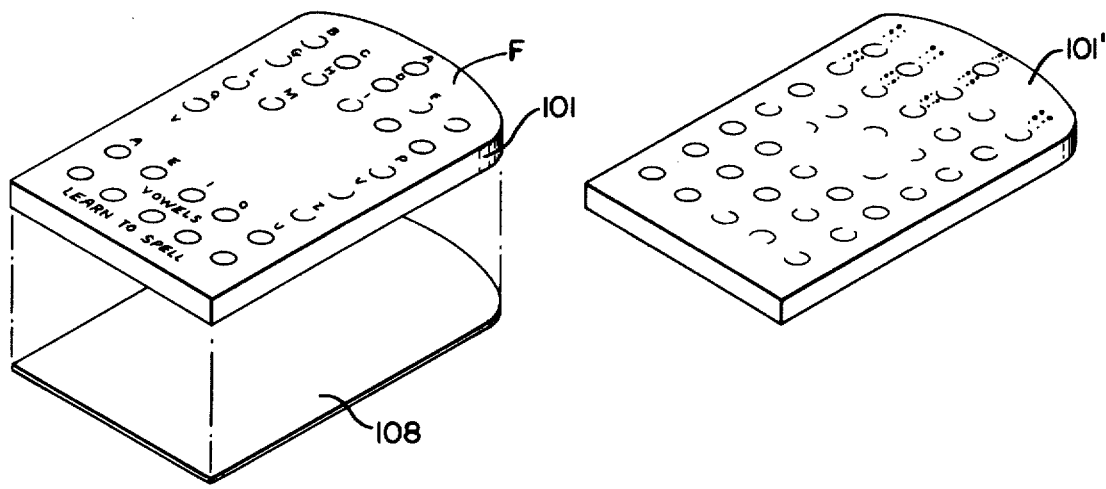
FIG. 5.
FIG. 6.

EDUCATIONAL TOY

BACKGROUND AND SUMMARY OF THE INVENTION

The present invention relates to an educational toy for children, and particularly for children ranging in age from 2 years to the first few primary grade ages. The present invention is particularly concerned with an educational toy which can be used to teach various basic skills, such as the alphabet, simple spelling, color identification, numbers, and simple arithmetic steps such as subtraction, addition, multiplication and division.

There are numerous known educational toys wherein one or more concepts or skills are reinforced or taught, which toys includes some type of board and a plurality of members or elements that can be selectively positioned on the board. For example, U.S. Pat. No. 3,077,677 discloses a word and alphabet game device which utilizes a board with recesses therein for accommodating removable pieces. U.S. Pat. No. 2,884,714 discloses an educational device for teaching spelling and arithmetic by the use of small removable pieces that are magnetically held in place on the board. U.S. Pat. No. 3,374,558 discloses an edcuational pegboard which includes recesses at one side thereof for accommodating pegs that can be removably inserted and arranged to form different patterns with templates being provided for selectively changing the effective recess pattern available in the pegboard. U.S. Pat. No. 3,970,312 discloses an educational game which utilizes a game board positioned in an upright position, which has question/answer templates selectively associated therewith for accommodating playing of question/answer games by children at opposite sides of the board utilizing pegs inserted into holes in the board. U.S. Pat. No. 2,695,462 discloses an educational toy for teaching arithmetic and numerical functions, and which includes detachable strips or templates, as well as apertures in the board and pegs insertable therein.

The known educational toys, as exemplified by the patents discussed in the preceding paragraph, have certainly aided in educating small children as to various simple concepts. However as a practical matter, many known educational toys are either too expensive, or too impractical in use, to satisfy all the requirements that such a toy should meet. Intentionally, or unintentionally, small children will bend, break, or smash, any toy or toy part that cannot withstand hammer blows, the weight of the child landing on the toy from the heighth of a chair or couch, the throwing thereof against a wall, against the floor or down the steps. Accordingly, the practical life of any toy or toy part that is not very ruggedly built is very short indeed. Once parents, teachers, or other potential purchasers of such educational toys have learned the lesson of how "indestructible" a toy must be, they will no longer purchase any toy having parts thereof that cannot withstand the use or "abuse" that the children will give the same. In practically all instances, those educational toys using relatively thin templates or the like will not survive the practical test of ruggedness.

Another disadvantage of many of the known prior art arrangements is that they are adaptable for only a single, or minimal number of concepts to be taught at a relatively fixed competence level such that they do not retain the child's interest for more than a limited time period. For example, an educational toy designed for small children under the age of two or three, is very unlikely to arouse the interest of even a five year old, and certainly not that of a six or seven year old. On the other hand, if the educational toy involves concepts that are comprehendible only by children in the primary school grades, it is extremely unlikely that such a toy would interest a two or three year old. An important object of the present invention is to provide an educational toy which does in fact have the adaptability to teach not only the simplest concepts, such as matching of colors and the simple physical step of placing a peg in the hole of similar shape, but also more complex concepts such as the alphabet, the numbers, spelling, and simple arithmetic, utilizing basically the same parts for teaching all of these concepts.

Another disadvantage of many known educational toys is that they are so expensive to make, and therefore have such a high price, that they are not readily marketable. The price at which such an educational toy can be sold is very critical to its commercial success, especially when one considers the above-discussed limited flexibility of the known educational toys insofar as being usable over an extended period of a child's development. Another important object of the present invention is to provide an educational toy which is not only rugged, but also simple and inexpensive to make, which thereby can be sold at a reasonable price.

Another drawback of many known educational toys, especially those involved in teaching spelling and arithmetic and the like, is that a very large number of very small pieces are involved. Such very small pieces are very difficult for a very small child, such as a two or three year old, to manipulate properly. Also, with very small pieces, the likelihood of some of them being lost, destroying the effectiveness of the game or toy as a teaching aid, is great. Also, such small toy pieces have a tendency to be distributed throughout the playroom, or the house, thereby creating clean-up problems. An important object of certain features of the present invention is to provide that the pieces to be manipulated by the child are sufficiently sized so as to accommodate physical handling by even a child as young as one year, and to also obviate the other mentioned problems that arise with very small pieces.

Another object of the present invention is to provide embodiments that can be used by blind children, as well as sighted children.

It is yet another object of the present invention to provide an educational toy wherein two different concepts, such as letters and numbers, can be learned separately from each other so as to avoid confusion, yet the two concepts can be interrelated so as to permit the child to utilize his knowledge of one concept to check and reinforce his knownledge and operations with respect to the other concept.

Still another object of this invention, in line with the previously noted object of being adaptable to teaching both simple and more complex concepts with basically the same parts, is to provide a toy wherein the child using it can learn or reinforce both rudimentary and more advanced skills on but a single side of a board.

Preferred embodiments of the present invention achieve certain of the above-noted and other objects by the provision of a board having a plurality of rows of holes extending completely therethrough with correspondingly cross-sectionally shaped pegs that fit loosely in the holes. In a particularly preferred embodiment of the invention, at least 26 such holes are provided, and the pegs have flattened surfaces at each end, with one end of the pegs bearing an imprint of a letter and the other end bearing the imprint of a number, with the respective letters A through Z and corresponding numbers 1 through 26 being provided. At one side of the board, respective letters of the alphabet are imprinted adjacent the openings to the through holes, while at the other side of the board, respective numbers are imprinted adjacent the openings to the holes. For use of the invention, a child need merely remove all the pegs, place the board on a table or any other flat backing surface, and depending upon whether the letters or numbers are facing upwardly, appropriately insert the respective pegs. In order to accommodate playing and exercise with the other of the alphabet and/or number set, the child need merely turn the board over and using the same set of pegs, but inverted, insert them in the respective appropriate numbered holes.

In particularly preferred embodiments, the pegs, as well as the rows of holes in the board, are colored or painted with respective different colors, such that the alphabet is split up into several subgroups, and such that the numbers 1 to 26 are also likewise split up into separate subgroups, denoted by color. With this arrangement, the child can associate the colors immediately with the set of five or six, for example, holes that the pegs belong in, thereby greatly simplifying the task of associating the respective numbers and letters on the pegs and board. Also, this feature of the color regions on the board, and the colored pegs, makes it feasible for a very young child of an age of two or so, to play with the device, since he need merely match the colored pegs with the colored holes. Once he has mastered the matching of the colored pegs with the colored holes, he can then proceed to the next level of trying to match the letters/numbers with the respective holes. In this way, the child's interest in the game, in use of the game, continues over a substantial period of time. As also explained below with respect to particularly preferred embodiments, much more complex spelling and arithmetic functions can be carried out with the present invention, thereby even further extending the time span within which a child will remain interested in and use the educational toy of the invention.

In preferred embodiments of the invention, more complex concepts such as spelling and/or arithmetic functions, can be carried out, with the provision of additional through holes in the board within which the child can insert appropriate pegs to spell words and/or carry out simple arithmetic functions. To facilitate both the spelling and the arithmetic functions, preferred embodiments include an additional set of pegs and corresponding through holes, having vowels and respective arithmetic signs plus (+), minus (−), equal (=), divide (÷) and multiplication (×) at the opposite ends thereof. These vowels and arithmetic symbol pegs are also preferably a different color than the remaining pegs, with correspondingly painted areas of the board adjacent their proper holes, so as to accommodate their identification, the learning of the vowels, and the learning of the mathematical symbols.

According to particularly preferred embodiments of the invention, the letters and numbers are disposed at the respective ends of the pegs so that they are properly positioned in the apertures when the complete board is turned over. In other words, one peg would have the letter "A" at one end and the number "1" at the other end, the row of pegs for the letters B to F have the respective numbers 6, 5, 4, 3, 2 at their opposite ends, etc. This not only facilitates maintenance of the proper arrangement of the pegs in the holes, it also aids in teaching the child the concept of the general relative position within the alphabet which each letter occupies. By the combination of features according to preferred embodiments, wherein a letter not only has a position, it also has a color, and a number, the child can reinforce and strengthen his/her grasp of the alphabet, as well as of the numbers. Also, the relative order of the letters with respect to one another, for example, in the middle part of the alphabet, can be very well reinforced and learned using the educational toy of the invention, a skill which can greatly aid later in searching in dictionaries, and the like where items are arranged alphabetically.

In certain preferred embodiments of the invention, included are different shaped cross-sections for the holes and corresponding pegs insertable therein, whereby the children can also associate the shape with the respective letters/numbers/vowels/arithmetic symbols. In these preferred embodiments, rather than providing separate through holes for the performance of spelling and arithmetic steps, a slot is provided having a dimensional width corresponding to the maximum width dimension of the respective pegs, so as to accommodate the different cross-sectional shapes thereof.

Preferred embodiments of the invention are also contemplated for use by persons who are blind. In these embodiments, the indicia for the numbers and letters are imprinted in braille on the pegs and on the board. Additionally, it is contemplated that braille indicia be given for the various different colored regions of the board so as to accommodate the full range of adaptability of the educational toy for use in educating blind children.

In particularly preferred embodiments of the invention, the board is made from a single block of material, preferably wood, fiberglass, or strong plastic, which block of material has a thickness greater than one-half inch ($\frac{1}{2}$") and preferably greater than one inch (1") whereby the board is very strong and rugged, capable of standing long and vigorous use by children of all ages and is able to stand on edge. Also, in particularly preferred embodiments, the pegs are in the form of right circular cylinders with flat end surfaces, with a diameter greater than $\frac{1}{4}$ inch so that the children, even very young children, can readily manipulate the same, and so that further the pegs can stand freely on a flat surface by themselves, thereby accommodating arrangement of the pegs with all of the letters, or with all of the numbers, facing upwardly, preliminary to them being placed in the holes in the board. In particularly preferred embodiments, the pegs have a length dimension greater than the thickness of the board so that they protrude upwardly therefrom when in position on the board with the board laying on a table or backing surface, but with the length being less than twice the thickness of the board. In a particularly preferred dimensional arrangement, the board is $1\frac{1}{2}$ inches in thickness, the holes are one inch in diameter, and the pegs are slightly less than one inch in diameter and are $2\frac{1}{2}$ inches long. While the above-noted dimensions are most preferable, "pocket-sized" versions for use by older children are contemplated according to other embodiments.

According to certain other preferred embodiments of the invention, the pegs for each set of one color the pegs which correspond to one similarly colored row or portion of the board are arranged in different lengths in a step-like manner, so as to accommodate proper positioning of the pegs even by children who do not yet recognize the letter and/or numerical indicia at the board and the pegs.

The various preferred embodiments of the present invention all exhibit the features of simplicity, ruggedness and adaptability to amuse and teach a wide range of ability and age group levels.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 4 is a part sectional, schematic, side view, taken in the direction of arrow IV of FIG. 3, said view also schematically depicting the backing board;

FIG. 5 is an exploded perspective view schematically illustrating the board of the embodiment of FIG. 1, with the separate backing board;

FIG. 6 is an exploded perspective view illustrating another embodiment, with the board similar to that of the FIG. 1 embodiment, but utilizing Braille indicia;

DETAILED DESCRIPTION OF THE PREFERRED EMBODIMENTS

Figure 1:
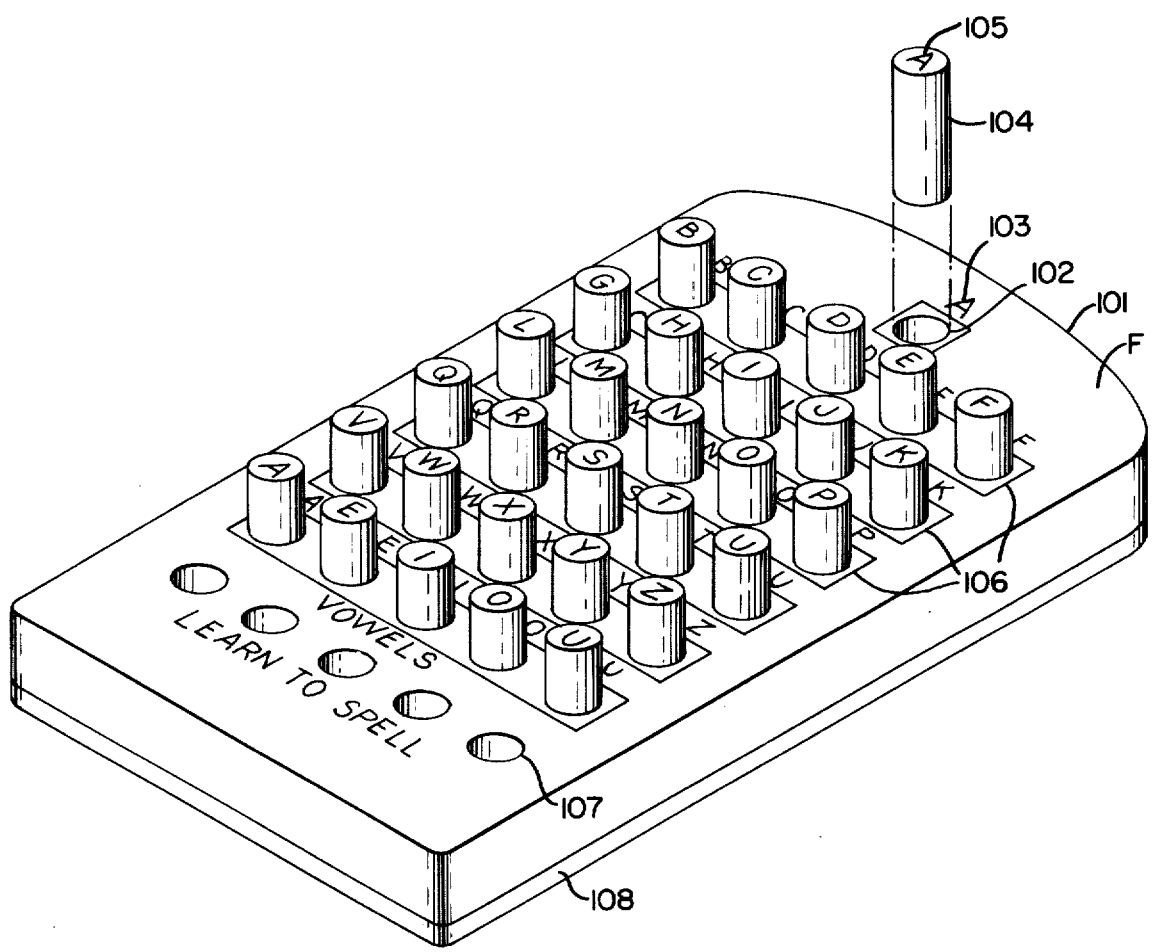
FIG. 1 is a perspective pictorial view depicting a first alphabet side of a game board with pegs inserted therein, constructed in accordance with a first preferred embodiment of the present invention.

It is noted that since the present invention includes the numerals 1–26 as part of certain of the illustrated preferred embodiments, so as to avoid confusion in the drawings, the reference numerals have been selected so as to begin with the number 101.

FIG. 1 pictorially shows one side of a first embodiment of the invention. This embodiment is further illustrated in FIGS. 2–5, and described in detail in the following paragraphs.

As can be seen from the drawings, a primary component of all of the embodiments according to the present invention is a board 101, 101', 101". Referring to FIGS. 1–4, board 101 has a plurality of holes 102 (reference numerals inserted on drawings for only a portion of these holes so as to better illustrate the features of the invention) which extend through the board from its front surface F, to its back surface B. Associated with each of the holes 102 is one member of a first set of indicia 103 representing a first concept, which in the case of the most preferred embodiment is shown as the letters of the alphabet positioned upon the front surface F of the board 101 in FIG. 2. The front surface F of board 101 includes the twenty-six letters of the alphabet arranged in rows, as well as an additional row containing indicia for the vowels. Similarly, a second set of indicia 103' representing a second concept is shown in the most preferred embodiment of the present invention in the form of arabic numbers 1 through 26 and arithmetic symbols for addition (+), subtraction (−), multiplication (×), division (÷) and equal to (=), on the back surface B of board 101.

A second principal feature of the educational toy according to the present invention is the provision of a plurality of pegs 104 which are equal in number (total of thirty-one in the illustrated embodiment) to the holes 102 and which correspond in cross-sectional shape to the cross-sectional shape of the holes 102. It is noted that, in the preferred embodiment of FIGS. 1 to 5 of the present invention, the pegs are each in the form of an elongated right circular cylinder member. This cylinder construction of the pegs greatly simplifies the construction since sections of doweling or the like can be used for the pegs and simple drilled holes can be formed in the board. Other preferred embodiments are contemplated which have triangular, rectangular, and other geometric cross-sectional shapes. In the case of the most preferred embodiments of FIGS. 1–5, it is important that all of the pegs 104 be of the same cross-sectional shape so that they may be interchangeably placed within the holes 102.

The cylinders 104 are provided with indicia 105, 105' such that, in the case of the most preferred embodiment of FIGS. 1–5 wherein language and mathematical indicia are illustrated, one letter of the alphabet is positioned on one end of each of the pegs and one number or mathematical sign is positioned on the opposite end of the pegs so that one peg 104 is properly associateable with only one of the respective holes 102. In the illustrated preferred embodiments, the letters/numbers on the pegs are similar to those on the board. Other embodiments are contemplated where the indicia associated with each of the holes are uppercase letters as shown and the indicia on the pegs are corresponding lowercase letters, and in the same manner, the number indicia on the reverse side B of the board are arabic numerals, as shown, with the number indicia on the pegs corresponding to Roman numerals or written numbers such as "one, two, . . . ".

Likewise, other concepts besides arithmatics and language, such as shape recognition, can be represented by the indicia, or the numbers and letters can be represented in Braille form (see FIG. 6), and even with the language and arithmatic concepts illustrated, more than 26 holes and pegs could be provided so as to include indicia representing additional letters, prefixes, suffices, or consonant blends, thereby increasing the number of numerals and/or symbols provided on the reverse side B, according to other contemplated embodiments of the invention.

In use of the educational toy, by simply inserting the pegs 104 into the holes 102 in the board 101, a very young child can refine his/her motor skills. For example, a child of two or three, when exposed to the educational toy of the present invention for the first time, experiences some difficulty in manipulating the pegs to insert them in the holes. However, after a short time period of playing usually less than an hour, such a child greatly enhances the motor skills necessary to insert and remove the pegs. Certain of the illustrated embodiments include physical dimensions for the pegs and holes which facilitate use thereof by very young children.

Subsequent to a child's development of motor skills needed to manipulate the pegs, he/she can learn the numbers and letters of the alphabet or other members of the sets of indicia 103, 103', 105, 105', as the case may be, by associating the indicia on the pegs 104 with the indicia on the board 101 and placing the appropriate pegs 104 in the appropriate hole 102.

In addition to the fundamental skills mentioned above, by providing the board 101 with a plurality of additional through openings 107, more advanced skills relating to the concepts represented by the indicia 103, 103', 105, 105' can be learned as well as their proper sequence. For example, in the embodiment according to FIGS. 1-3, five holes 107 are shown extending through the board 101 which can be utilized for spelling words such as the word "boat" shown in FIG. 2, or for practicing arithmetic equations such as "10×2=20" as is shown in FIG. 3. Alternative embodiments are also contemplated wherein the openings 101 are recesses at both sides of the board 101, rather than through openings.

In this regard, it is noted that an advantageous feature of the most preferred embodiments lies in that the letter indicia 103, 105 are positionally coordinated to the numerical indicia 103', 105' such that, when the pegs 104 are placed in the proper holes with the indicia on one of the ends of the pegs 105, 105' matched in the proper sequence with the indicia 103, 103' on the surface of the board, the indicia on the opposite end of the pegs will be matched in the proper sequence with the indicia on the other side of the board. This provides a beneficial self-checking feature for a child who may know one concept, such as the letters of the alphabet, better than another concept, such as the numbers from 1-26.

A further advantageous feature of the present invention which is shown in the illustrated embodiments is the provision of a plurality of color bands 106, one being provided of respective different colors, for each of the rows of holes 102. The pegs 104 corresponding to the holes of a particular color band are colored the same color. By providing these color bands and colored pegs, not only are the board and pegs made eye-catching and appealing to children, but by providing each row with a band of a different color, the letters of the alphabet are split up into several subgroups, as are the numbers 1-26, thereby further facilitating the learning process since the child can associate the colors immediately with a set of five or six, for example, holes that the pegs belong in, thereby greatly simplifying the task of associating the respective numbers and letters on the pegs and board. That is, it would be easier for a child to learn the members of the subset 2-6 if the child can consider these numbers separately from other members because of their color, as opposed to distinguishing them from a set of 26 numbers and five symbols which includes the numbers 22-26 with which the numbers 2-6 could easily be confused by a preschool child learning numbers for the first time.

Once the child has learned the members of a set of indicia, whether it be alphabetic, numeric or otherwise, continued matching of the pegs with the holes will serve to reinforce his/her acquired knowledge, but in order to enable the illustrated embodiments to accommodate further growth and mental development of the child and serve as a continuing source of enjoyment and educational development, the most preferred embodiments are provided with the above-noted plurality of indicialess openings 107 of the same cross-sectional shape as the pegs 104 and the holes 102 so that the various pegs can be selected and inserted into the openings for carrying out more advanced exercises such as spelling and arithmetic as previously noted. Additionally, while five holes 107 are shown extending through the board 101, these embodiments are contemplated with a larger number of openings 107 placed at any desired location of the board spaced from the rows of holes 102, and unlike the holes 102, the openings 107 need not extend through the board, but could be recessed openings which correspond in shape to the holes 102 and pegs 104.

In addition to the above-described components, the most preferred embodiments of the present invention also include a backing board 108 which, though not necessary to the use and enjoyment of the toy, facilitates carrying the board 101 about with the pegs 104 in place within the holes 102 or openings 107 without their falling out, and facilitates turning over of the board 101 with the pegs in place or placing the board 101 on edge for use of the above-noted self-checking feature as will be more fully pointed out in discussing the manner of use of the educational toy.

Figure 2:
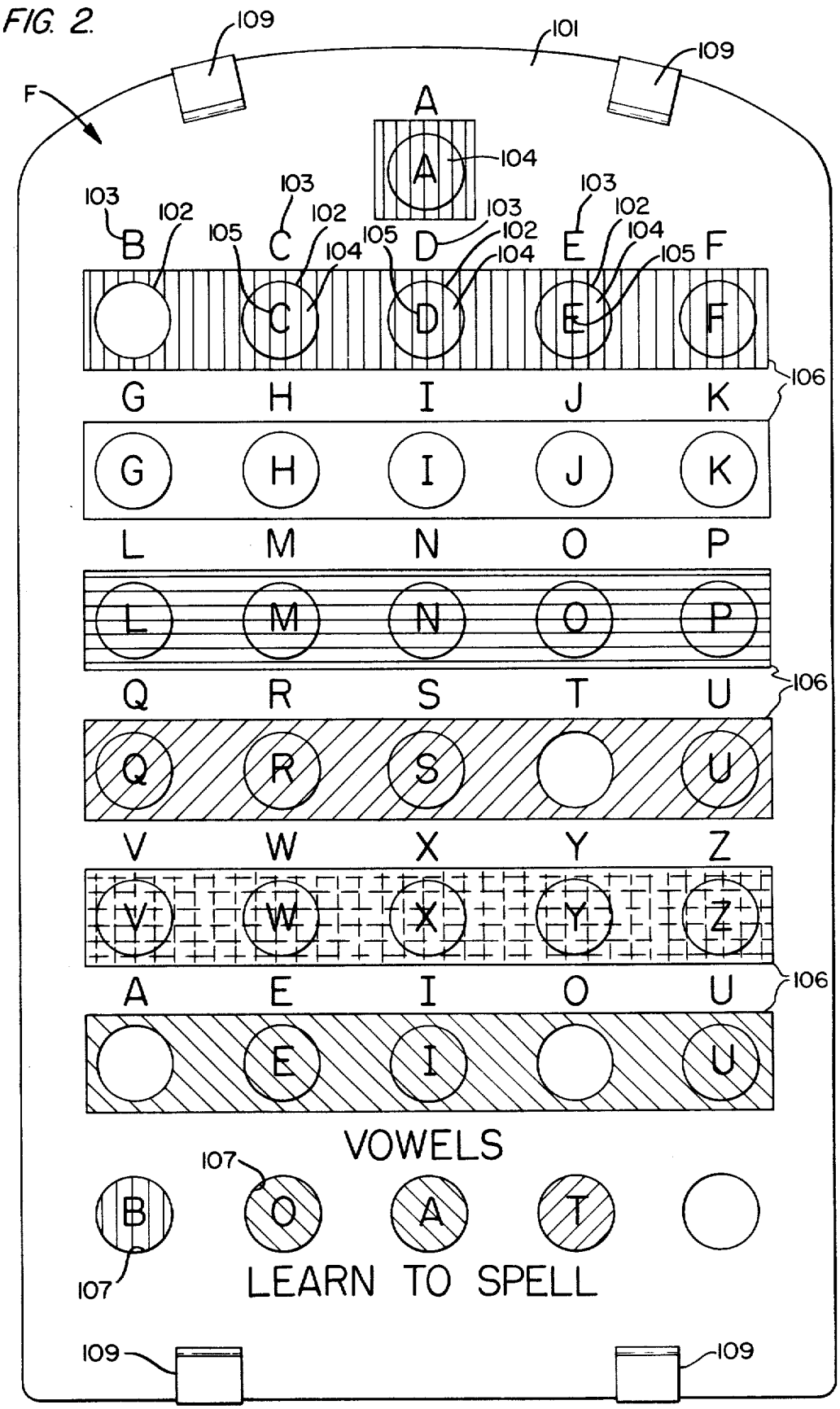
FIG. 2 is a plan view showing the alphabet side of the game board and inserted pegs of the FIG. 1 embodiment.
Figure 3:
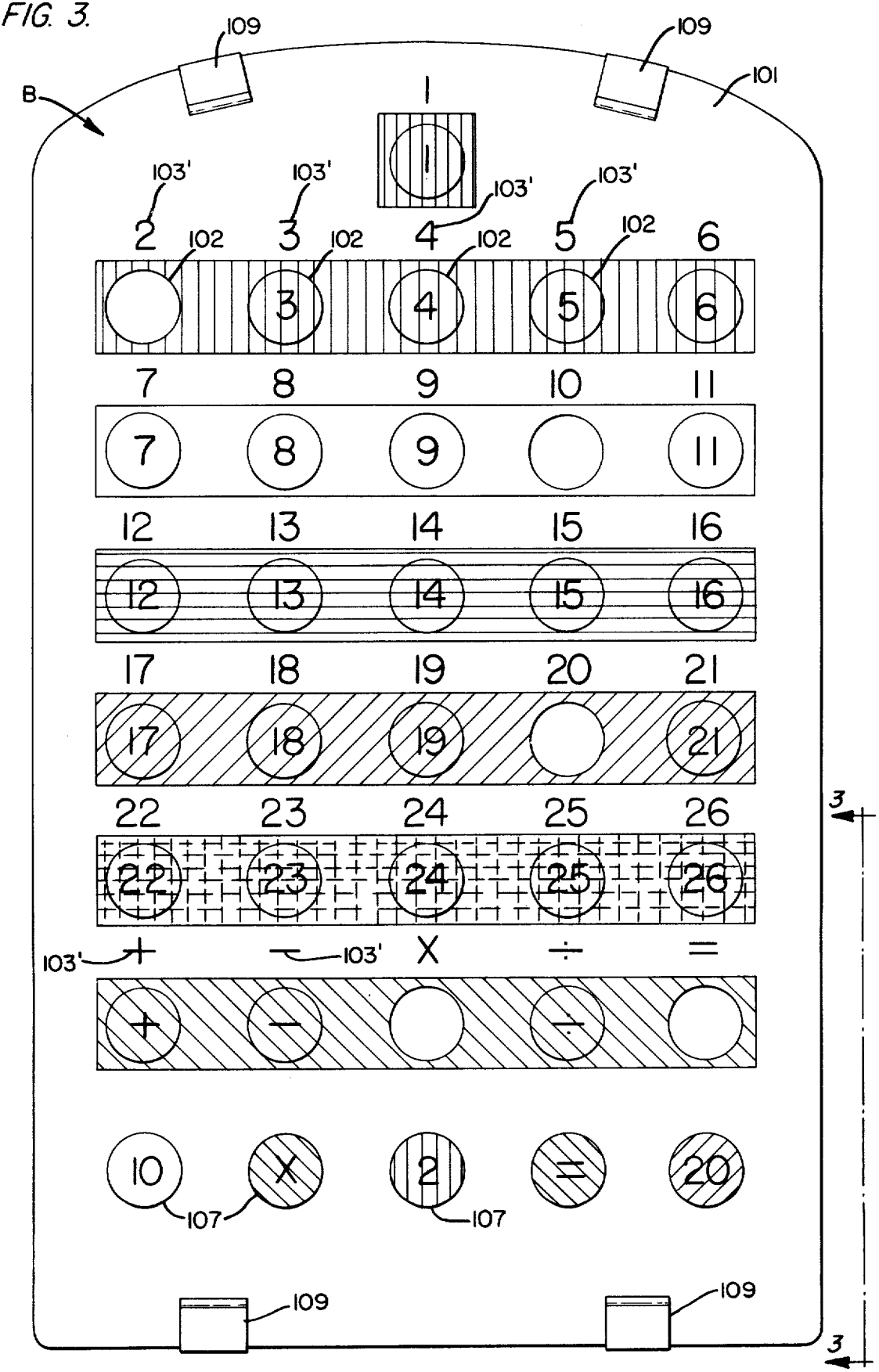
FIG. 3 is a plan view of the opposite number side of the board and respective pegs inserted therein of the embodiment of FIG. 1.

In FIGS. 2-4, separate detachable simple spring clips 109 are illustrated for use in securing the backing-board 108 to a selected surface of the board 101, and when it is desired to switch sides of the board 101, the clips 109 can be easily removed and the backing-board 108 separated from the board 101 (as shown in FIG. 5) and then the clips resecured at any desired position. In this regard, it is noted that while the clips 109 are shown for illustration purposes at the top and bottom of the board 101, if the board is to be utilized in a vertical orientation sitting upon its bottom edge, the clips 109 could be secured at its longitudinal sides instead of at the top and the bottom and, in fact, it has been found that it is best to utilize the clips 109 primarily for those times when the board is to be carried about or stored with the pegs 104 in place within the holes 102.

According to further unillustrated alternative arrangements, the backing-board 108 can be secured to the side of the board 101 by hinges which are in the form of a double hinge with an intermediate spacer plate so that the board can be swung from a position against the back of the board to a position against the front of the board, depending upon the side to be utilized, or the board 101 can be provided with flanges under which the backing board is slidable.

In use, the child would place the board 101 so as to overlie the backing-board 108 upon any suitable surface such as a table or the floor, and all of the pegs 104 would be removed. The child would then proceed to reinsert all of the pegs 104 into their appropriate hole 102, matching the letter, number, or symbol 105, 105', with the corresponding number, letter or symbol 103, 103' until all of the pegs 104 have been inserted into the holes 102. Once this process is complete, the child then can raise the board from a horizontal orientation to a vertical orientation utilizing the backing-board 108 to prevent the pegs 104 from falling out of the holes. Since the board 101 is preferably formed so as to be greater than one-half inch ($\frac{1}{2}$") and preferably greater than one inch (1") thick, the board will be stable when standing on edge. The backing-board 108 can then be removed from against what had been the bottom of the board 101, exposing the other set of letters, numbers, and/or symbols, and then repositioned against the side that had been previously visible so as to cause the pegs 104 to slide within the holes 102 until they are now flush with the contacting surfaces of the backing board 108 and playing board 101. The playing board 101 can then be lowered back to a horizontal orientation and the child can determine whether or not he has correctly repositioned all of the pegs 104 within the holes 102 since if they were properly reinserted, on the letter side of the board F, for example, then all of the numbers would be in proper numerical sequence on the now visible side B.

Of course, the above-noted complete sequence of operations is intended for the matching features of the present invention, and when the toy is to be utilized for more complex operations such as spelling and arithmatic equations, the child need only select the appropriate pegs 104 for performing the desired operation, whether it be spelling or arithmetic, and then once the operation has been performed, those pegs 104 can be returned to their holes 102 and other pegs 104 selected for insertion into the openings 107. For extended use of only one side of the playing board 101, the same can be placed on a table or any flat surface, without the backing board 108 being needed.

FIG. 6 schematically depicts another preferred embodiment which includes Braille indicia on the pegs and on the board 101' to accommodate use by blind persons. The Braille indicia can be included for the letters, numbers, mathematical symbols, and colors of the embodiment of FIGS. 1-5, whereby the full range of the toy can also be realized for blind children.

Figure 7:
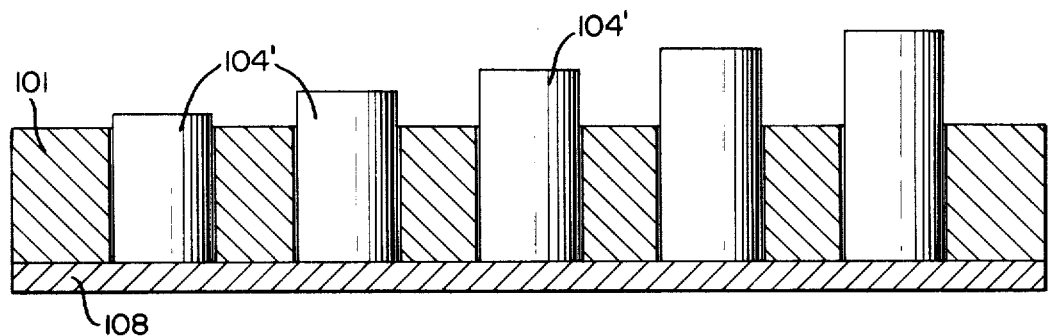
FIG. 7 is a side partial schematic view depicting another preferred embodiment of the invention with pegs of different lengths.

According to the embodiment shown in FIG. 7, the playing board is constructed in the same manner as the board 101 and, accordingly, like reference numerals have been utilized. However, in this embodiment, pegs 104' are provided which are of various different lengths so that the pegs 104' are all of different lengths within any given row. Thus, since the pegs 104' conform in color to the color bands 106 for the row of holes 102, by stepping the pegs 104' in height across any given row, each letter, number, or symbol can be associated by the child according to its size and color. In this manner, the educational toy according to the FIG. 7 embodiment accommodates proper positioning of the pegs even by children who do not recognize the letter and/or numerical indicia on the board 101 and the pegs 104'. Therefore, even a very young child can effectively learn to associate the letters/numbers, prior to actually "knowing" either letters or numbers.

Figure 8:
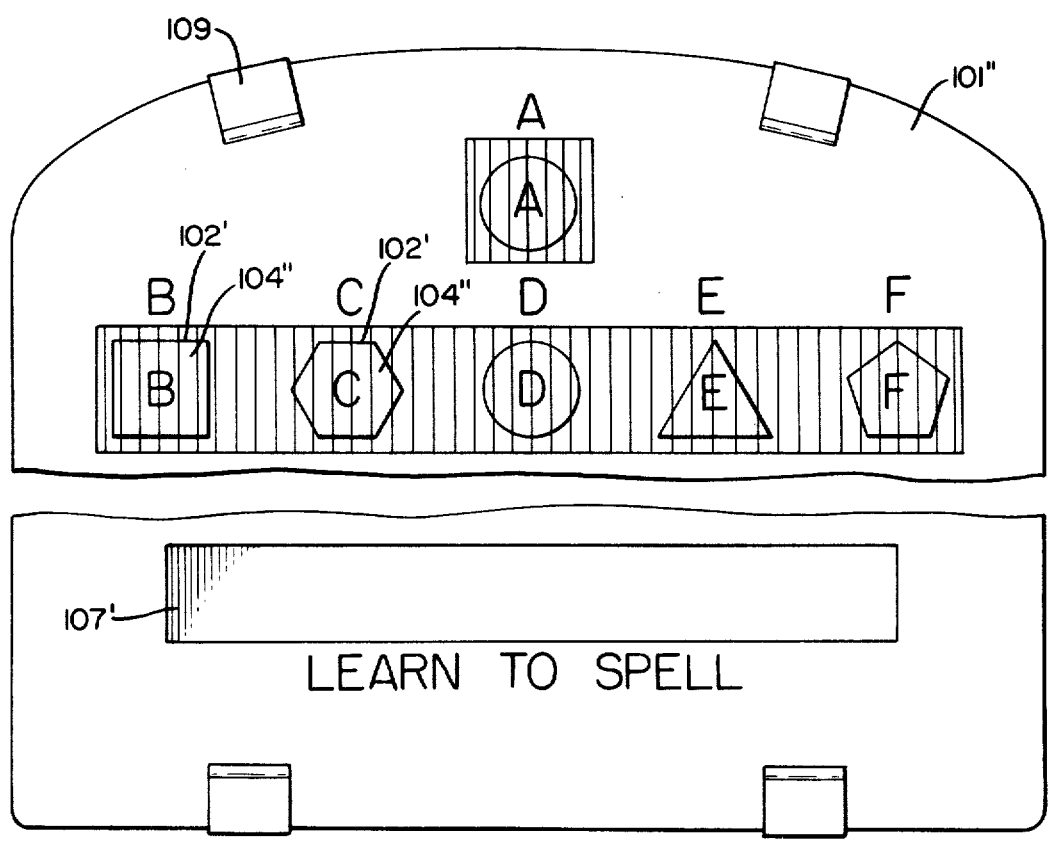
FIG. 8 is a partial plan view of yet another embodiment of the invention wherein the through holes in the board and the corresponding pegs have respective different cross-sectional shapes.

According to the further embodiment shown in FIG. 8 of the drawings, instead of utilizing pegs which are stepped in height, this embodiment forms each of the holes 102' in board 101" of a different cross-sectional shape within a given row and the corresponding pegs 104" have respective corresponding different cross-sectional shapes. In this manner, the toy not only enables the child to properly position the pegs without the ability to recognize the letter and/or numerical indicia due to the fact that no two holes 102' or pegs 104" are provided with the same cross-sectional shape and color, but the child's dexterity and shape recognition skills are further strengthened.

However, since the pegs according to this embodiment of FIG. 8 are of different cross-sectional shapes, in order to facilitate the performance of more advanced functions such as spelling and arithmetic, the openings 107 of the previous embodiments are replaced by a single opening 107' which is provided in the form of a slot having a dimensional width corresponding to the maximum width dimension of the pegs 104", so as to accommodate the different cross-sectional shapes thereof.

Accordingly, it will be appreciated that the present invention provides a simple and versatile educational toy by which both fundamental and more advanced aspects of a concept, such as the alphabet and spelling or counting and arithmetic, can be learned and which can be economically produced of a rugged construction from relatively inexpensive materials, preferably wood, plastic, or fiberglass. Furthermore, the indicia provided on the board and on the pegs can be formed not only by printing or painting, but can be in the form of three-dimensional configurations recessed into the pegs or projecting therefrom as an integral or attached three-dimensional formation.

Therefore, while I have shown and described several embodiments in accordance with the present invention, it is understood that the same is not limited thereto, but is susceptible to numerous changes and modifications as is known to those skilled in the art and I, therefore, do not wish to be limited to the details shown and described herein, but intend to cover all such changes and modifications as are encompassed by the scope of the appended claims.

I claim:

1. An educational toy comprising:
   (a) a board having a plurality of holes on a first portion of a front surface and a back surface of said board, a first set comprising a plurality of indicia representing a language concept being positioned on the front surface of the board, each member of the first set being associated with a respective one of said holes, a second set comprising a plurality of indicia representing a mathematical concept being positioned on the back surface of the board, each member of the second set being associated with a respective one of said holes and aperture means in said board on a second portion of said front and back surfaces; and
   (b) a plurality of pegs, each peg corresponding in cross-sectional shape to the cross-sectional shape of at least one of said holes, one member of the first set of indicia being positioned on one end of each of said pegs, and one member of the second set of indicia being positioned on the opposite end of said pegs, said pegs being placeable within said holes on said first portion for accommodating learning of the members of said sets by associating indicia on said pegs with the indicia associated with the holes and said pegs being placeable within said aperture means on said second portion for utilizing the members of the sets to learn more advanced aspects of said concepts.

2. An educational toy according to claim 1, wherein said holes are arranged in a plurality of rows.

3. An educational toy according to claim 2, wherein said aperture means comprises a row of indicialess openings on each of said surfaces, all of the holes, pegs, and openings being of the same cross-sectional shape, whereby selected pegs can be interchangeably placed in said openings for learning the concepts represented by the sets of indicia.

4. An educational toy according to claim 2, wherein the indicia of the sets are arranged in sequential order within each row and from row to row.

5. An educational toy according to claim 1 or 2 or 3 or 4, wherein the indicia of the first set are positionally coordinated to the indicia of the second set such that, when the pegs are placed in the holes with the indicia on one end of the pegs matched in the proper sequence with the indicia on one surface of the board, the indicia on the opposite end of the pegs will be matched in the proper sequence with the indicia on the other side of the board.

6. An educational toy according to claim 1, further comprising a backing-board associatable with both said front and rear surfaces so as to block one end of the holes.

7. An educational toy according to claim 6, wherein the backing-board is secured to the board by C-clips.

8. An educational toy according to claims 3 or 4, wherein each of the plurality of rows or holes is provided with a separate color band, each color band being of a different color, and wherein pegs bearing indicia corresponding to indicia associated with a particular row of holes are formed of the same coloration as the color band that the particular row of holes is provided with, whereby the members of the sets can be learned in groups, and whereby the learning of colors is facilitated.

9. An educational toy according to claim 1, wherein said set of language indicia are letters of the alphabet.

10. An educational toy according to claim 9, wherein the indicia are formed as Braille symbols.

11. An educational toy according to claim 1, wherein the indicia of the first set are positionally coordinated to the indicia of the second set such that, when the pegs are placed in the holes with the indicia on one end of the pegs matched in the proper sequence with the indicia on one surface of the board, the indicia on the opposite end of the pegs will be matched in the proper sequence with the indicia on the other side of the board.

12. An educational toy according to claim 1, wherein said aperture means is an indicialess opening in the form of a slot sized to receive any of a plurality of said pegs, whereby selected pegs can be interchangeably placed in said opening for learning the concepts represented by the sets of indicia.

13. An educational toy according to claim 2, wherein each hole within each respective row of the plurality of rows of holes is of a different shape from the other holes within the respective row, and wherein each of said pegs is provided with a cross-sectional shape which will fit in one of the holes when the indicia on the peg is properly associated with the indicia associated with the hole.

14. An educational toy according to claim 13, wherein the indicia of the first set are positionally coordinated to the indicia of the second set such that, when the pegs are placed in the holes with the indicia on one end of the pegs matched in the proper sequence with the indicia on one surface of the board, the indicia on the opposite end of the pegs will be matched in the proper sequence with the indicia on the other side of the board.

15. An educational toy according to claim 14, wherein said aperture means is an indicialess opening in the form of a slot sized to receive any of a plurality of said pegs, whereby selected pegs can be interchangeably placed in said opening for learning the concepts represented by the sets of indicia.

16. An educational toy according to claim 1, wherein said holes extend completely through said board from said first side to said second side.

17. An educational toy according to claim 1 or 16, wherein said plurality of pegs are equal in number to the number of holes on the first portion of one of said surfaces of the board, and wherein the members of the sets of indicia associated with each hole are the same as the members of the sets of indicia on each respective peg placeable therein.

18. An educational toy according to claim 17, wherein said first set of indicia comprises numbers and mathematical symbols and said second set comprises letter of an alphabet.

19. An educational toy comprising:
(a) a board having a plurality of holes on a front surface and on a back surface of said board, a first set of indicia representing a first concept being positioned on the front surface of the board, one member of the first set being associated with each of said holes, a second set of indicia representing a second concept being positioned on the back surface of the board, one member of the second set being associated with each of said holes; and
(b) a plurality of pegs, each peg corresponding in cross-sectional shape to the cross-sectional shape of at least one of said holes, one member of the first set of indicia being positioned on one end of each of said pegs, and one member of the second set of indicia being positioned on the opposite end of said pegs, whereby said pegs can be placed within said holes for accommodating learning of the members of said sets by associating indicia on said pegs with the indicia associated with the holes, wherein said holes are arranged in a plurality of rows and wherein said plurality of pegs are of different lengths, said peg lengths being chosen so as to progressively increase in height when the pegs are inserted within each of said plurality of rows of holes with the indicia on an end of each of the pegs properly matched to a respective indicia associated with each of the holes.

20. An educational toy according to claim 19, wherein the indicia of the first set are positionally coordinated to the indicia of the second set such that, when the pegs are placed in the holes with the indicia on one end of the pegs matched in the proper sequence with the indicia on one surface of the board, the indicia on the opposite end of the pegs will be matched in the proper sequence with the indicia on the other side of the board.

21. An educational toy according to claim 19, wherein each of the plurality of rows of holes is provided with a separate color band, each color band being of a different color, and wherein pegs bearing indicia corresponding to indicia associated with a particular row of holes are formed of the same coloration as the color band that the particular row of holes is provided with, whereby the members of the sets can be learned in groups, and whereby the learning of colors is facilitated.

22. An educational toy comprising:
(a) a board having a plurality of holes on a front surface and on a back surface of said board, a first set of indicia representing a first concept being positioned on the front surface of the board, one member of the first set being associated with each of said holes, a second set of indicia representing a second concept being positioned on the back surface of the board, one member of the second set being associated with each of said holes; and (b) a plurality of pegs, each peg corresponding in cross-sectional shape to the cross-sectional shape of at least one of said holes, one member of the first set of indicia being positioned on one end of each of said pegs, and one member of the second set of indicia being positioned on the opposite end of said pegs, whereby said pegs can be placed within said holes for accommodating learning of the members of said sets by associating indicia on said pegs with the indicia associated with the holes, wherein said holes are arranged in a plurality of rows, wherein each hole within each respective row of the plurality of rows of holes is of a different shape from the other holes within the respective row, and wherein each of said pegs is provided with a cross-sectional shape which will fit in one of the holes when the indicia on the peg is properly associated with the indicia associated with the hole, wherein said board is provided with an indicialess opening in the form of a slot sized to receive any of a plurality of said pegs, whereby selected pegs can be interchangeably placed in said opening for learning the concepts represented by the sets of indicia, and wherein each of the plurality of rows of holes is provided with a color band, each color band being of a different color and wherein each of said plurality of pegs is of a different cross-sectional shape and color from all of the other of said pegs.

23. An educational toy comprising:
(a) a board having a plurality of holes on a front surface and a back surface of said board, a first set of indicia representing a first concept being positioned on the front surface of the board, one member of the first set being associated with each of said holes, a second set of indicia representing a second concept being positioned on the back surface of the board, one member of the second set being associated with each of said holes; and
(b) a plurality of pegs, each peg corresponding in cross-sectional shape to the cross-sectional shape of at least one of said holes, one member of the first set of indicia being positioned on one end of each of said pegs, and one member of the second set of indicia being positioned on the opposite end of said pegs, whereby said pegs can be placed within said holes for accommodating learning of the members of said sets by associating indicia on said pegs with the indicia associated with the holes, wherein said holes are arranged in a plurality of rows, wherein each hole within each respective row of the plurality of holes is of a different shape from the other holes within the respective row, and wherein each of said pegs is provided with a cross-sectional shape which will fit in one of the holes when the indicia on the peg is properly associated with the indicia associated with the hole, wherein the indicia of the first set are positionally coordinated to the indicia of the second set such that, when the pegs are placed in the holes with the indicia on one end of the pegs matched in the proper sequence with the indicia on one surface of the board, the indicia on the opposite end of the pegs will be matched in the proper sequence with the indicia on the other side of the board, wherein said board is provided with an indicialess opening in the form of a slot sized to receive any of a plurality of said pegs, whereby selected pegs can be interchangeably placed in said opening for learning the concepts represented by the set of indicia, and wherein each of the plurality of rows of holes is provided with a color band, each color band being of a different color and wherein each of said plurality of pegs is of a different cross-sectional shape and color from the other of said pegs.

24. An educational toy comprising:
(a) a board having a plurality of holes on a front surface and a back surface of said board, a first set of indicia representing a first concept being positioned on the front surface of the board, one member of the first set being associated with each of said holes, a second set of indicia representing a second concept being positioned on the back surface of the board, one member of the second set being associated with each of said holes; and
(b) a plurality of pegs, each peg corresponding in cross-sectional shape to the cross-sectional shape of at least one of said holes, one member of the first set of indicia being positioned on one end of each of said pegs, and one member of the second set of indicia being positioned on the opposite end of said pegs, whereby said pegs can be placed within said holes for accommodating learning of the members of said sets by associating indicia on said pegs with the indicia associated with the holes;
wherein said holes are arranged in a plurality of rows, wherein each of the plurality of rows of holes is provided with a separate color band, each color band being of a different color, and wherein pegs bearing indicia corresponding to the indicia associated with a particular row of holes are formed of the same coloration as the color band that the particular row of holes is provided with, whereby the members of the sets can be learned in groups, and whereby the learning of colors is facilitated.

25. An educational toy comprising:
(a) a board having a plurality of holes extending completely therethrough from a front surface to a back surface, a first set comprising a plurality of indicia representing a language concept being positioned on the front surface of the board, each member of the first set being positioned adjacent a respective one of said holes, a second set comprising a plurality of indicia representing a mathematical concept being positioned on the back surface of the board, each member of the second set being positioned adjacent a respective one of said holes; and
(b) a plurality of pegs equal in number to said plurality of holes, each peg corresponding in cross-sectional shape to the cross-sectional shape of at least one of said holes, one member of the first set of indicia being positioned on one end of each of said pegs and matching the indicia positioned adjacent a respective one of said holes on the front surface, and one member of the second set of indicia being positioned on the opposite end of said pegs and matching the indicia positioned adjacent a respective one of said holes on the rear surface, said pegs being placeable within said holes whereby a single set of pegs and a single board serves for accommodating learning of the members of said sets by associating indicia on said pegs with the indicia positioned adjacent the holes.

26. An educational toy according to claim 25, wherein the indicia on the ends of said pegs and adjacent said holes are so selected that when said pegs are positioned with said holes with the indicia on one end of each of said pegs in matching relationship with respect to the indicia adjacent the respective holes on one side of the board, the indicia on the opposite end of said pegs will be in matching relationship to the indicia adjacent the respective hole on the other side of the board, whereby language and mathematical learning operations can be used to check one another.

27. An educational toy according to claims 25 or 26, wherein said board is additionally provided with aperture means on both sides of said board and into which said pegs are insertable for facilitating the learning of aspects of said concepts involving the positional interrelating of a plurality of the members of a respective set of indicia.

28. An educational toy according to claim 27, wherein said holes are arranged in a plurality of rows.

29. An educational toy according to claim 28, wherein said aperture means comprises a row of indicia-less openings on each of said surfaces, all of the holes, pegs, and openings being of the same cross-sectional shape, whereby selected pegs can be interchangeably placed in said openings for learning the concepts represented by the sets of indicia.

* * * * *